United States Patent
de Silva et al.

(10) Patent No.: US 8,249,805 B2
(45) Date of Patent: Aug. 21, 2012

(54) AUTOMATIC UPDATING OF FAVORITE PLACES FOR NAVIGATION SYSTEM UPON CHANGE OF HOME ADDRESS

(75) Inventors: Andrew de Silva, Torrance, CA (US); Jianning Zhuang, Torrance, CA (US); Jose Mazas, Torrance, CA (US); Alex Panganiban, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 550 days.

(21) Appl. No.: 12/316,526

(22) Filed: Dec. 12, 2008

(65) Prior Publication Data
US 2010/0152997 A1     Jun. 17, 2010

(51) Int. Cl.
*G01C 21/00*     (2006.01)
(52) U.S. Cl. ... 701/450; 701/426; 701/532; 340/995.24; 707/920
(58) Field of Classification Search .......... 701/200–202, 701/207–210, 426, 450; 340/995.24
See application file for complete search history.

(56) References Cited

U.S. PATENT DOCUMENTS

| | | | | |
|---|---|---|---|---|
| 5,424,951 A * | 6/1995 | Nobe et al. | | 701/200 |
| 6,477,461 B2 * | 11/2002 | Tanaka et al. | | 701/461 |
| 6,484,094 B1 * | 11/2002 | Wako | | 701/211 |
| 6,622,087 B2 * | 9/2003 | Anderson | | 701/209 |
| 6,687,613 B2 * | 2/2004 | Yokota | | 701/209 |
| 6,687,733 B2 | 2/2004 | Manukyan | | |
| 6,775,613 B2 * | 8/2004 | Burt et al. | | 701/408 |
| 6,829,532 B2 * | 12/2004 | Obradovich et al. | | 701/207 |
| 6,839,628 B1 * | 1/2005 | Tu | | 701/209 |
| 7,082,365 B2 * | 7/2006 | Sheha et al. | | 701/209 |
| 7,133,775 B2 * | 11/2006 | Adamski et al. | | 701/211 |
| 7,155,339 B2 * | 12/2006 | Tu | | 701/209 |
| 7,171,304 B2 * | 1/2007 | Wako | | 701/200 |
| 7,272,489 B2 * | 9/2007 | Tu | | 701/209 |
| 7,321,826 B2 * | 1/2008 | Sheha et al. | | 701/209 |
| 7,353,109 B2 * | 4/2008 | Han | | 701/209 |
| 7,546,202 B2 * | 6/2009 | Oh | | 701/200 |
| 7,751,968 B2 * | 7/2010 | Yamada et al. | | 701/426 |
| 7,826,965 B2 * | 11/2010 | Sadri et al. | | 701/200 |
| 8,014,939 B2 * | 9/2011 | Sheha et al. | | 701/200 |
| 2007/0219706 A1 * | 9/2007 | Sheynblat | | 701/200 |

FOREIGN PATENT DOCUMENTS

JP     2006-15938     1/2006

* cited by examiner

*Primary Examiner* — Thomas G. Black
*Assistant Examiner* — Lindsay M Browder
(74) *Attorney, Agent, or Firm* — Muramatsu & Associates

(57) ABSTRACT

A method and apparatus for automatically updating information on favorite places upon change of home address. The method includes the steps of: checking data received by the navigation system to detect whether the old home address of a user has been changed to the new home address; searching for favorite places around the new home address equivalent to that around the old home address; determining whether the updating of the favorite places should be conducted automatically or upon instruction by the user; updating the favorite places by replacing the favorite places for the old home address with the equivalent favorite places for the new home address; and repeating the above steps every time when there is a change in the home address.

18 Claims, 9 Drawing Sheets

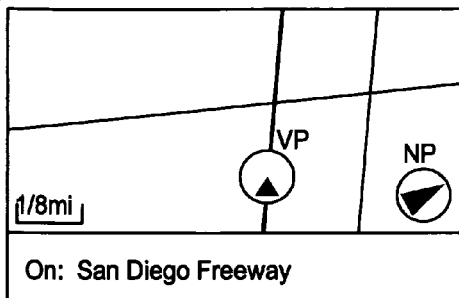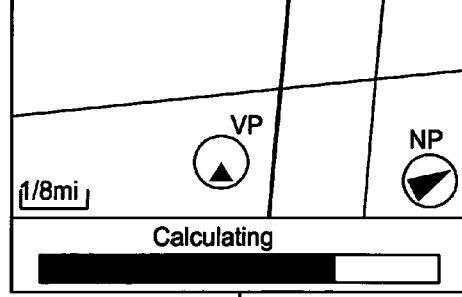

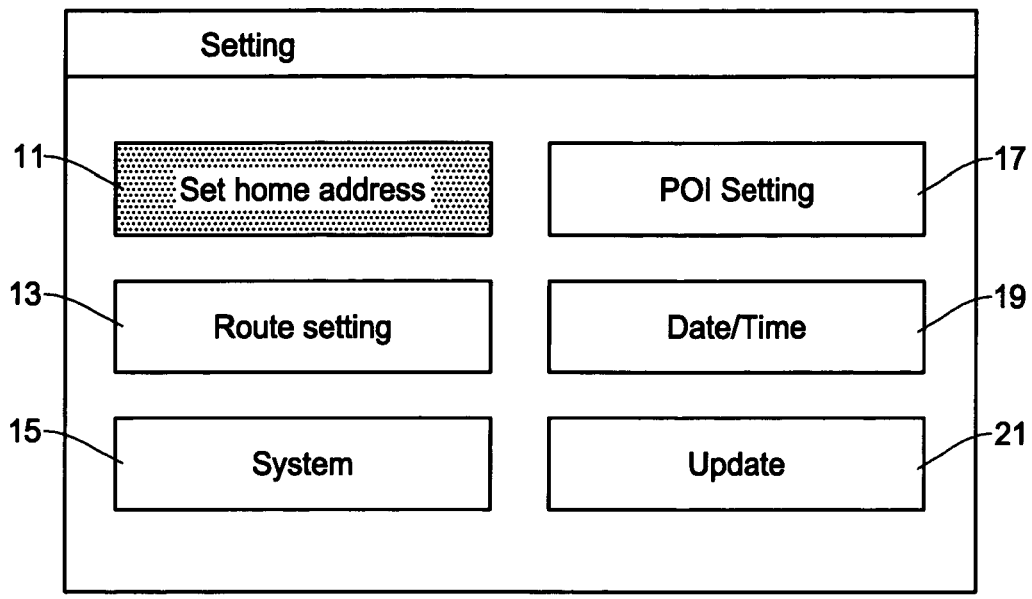

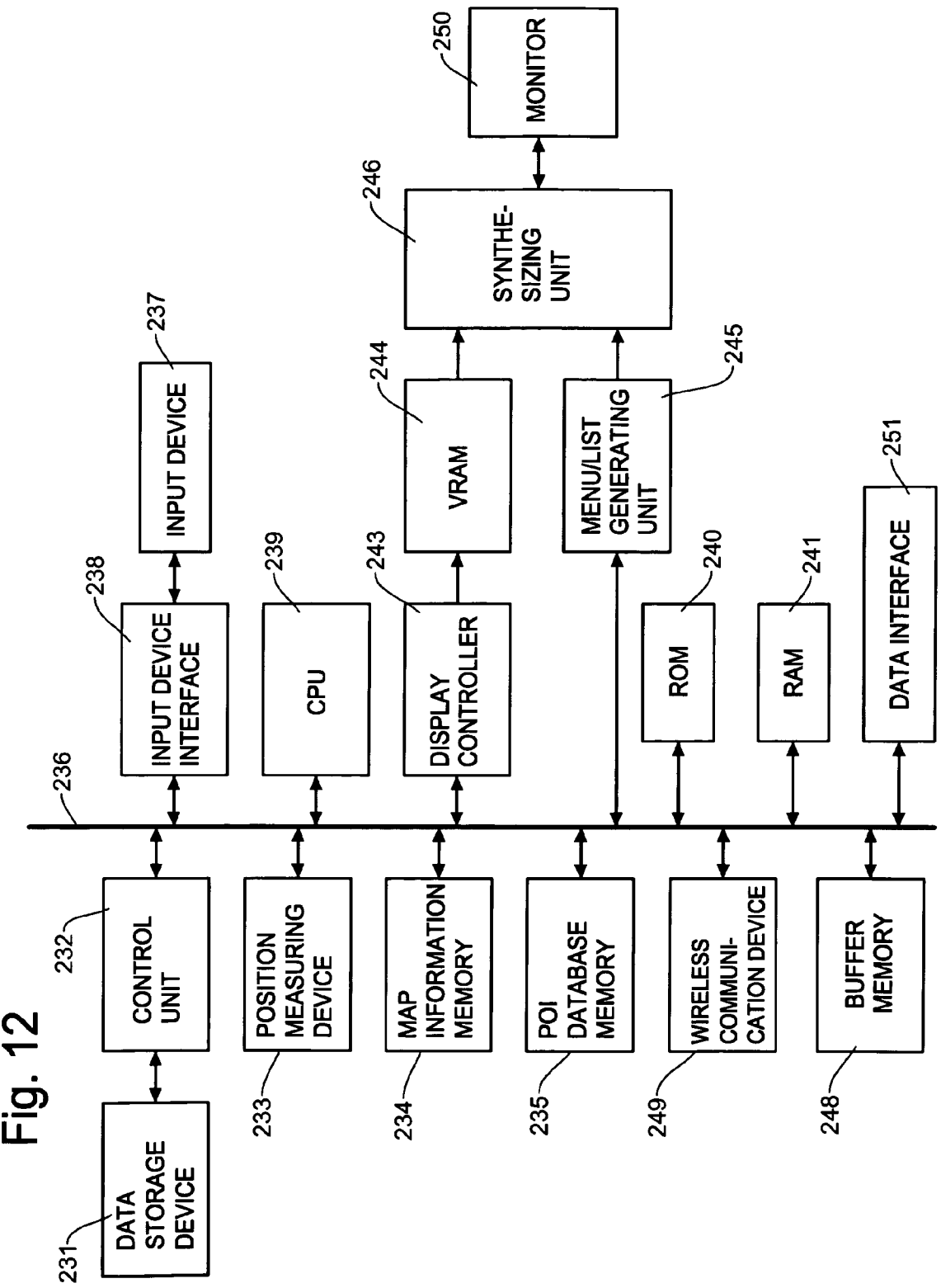

AUTOMATIC UPDATING OF FAVORITE PLACES FOR NAVIGATION SYSTEM UPON CHANGE OF HOME ADDRESS

FIELD OF THE INVENTION

This invention relates generally to a method and apparatus for updating personal and favorite information in response to a change of home address, and more particularly, to a method and apparatus for updating personal and favorite information automatically based on the user's preference upon changes in the home address.

BACKGROUND OF THE INVENTION

A navigation system performs travel guidance, enabling a user to easily and quickly reach the selected destination. A typical example of a vehicle navigation system is a vehicle equipped with a navigation function that guides a driver to a destination through a calculated route. Such a navigation system detects the position of the user's vehicle, and reads out map data pertaining to an area at the current vehicle position from a data storage medium, for example, a DVD (digital versatile disc), or a hard disk drive. Typically, the navigation system displays a map image on a monitor screen while superimposing thereon a mark representing the current location of the user's vehicle and an image of a road on which the vehicle is running.

FIGS. 1A-1H show an example of the overall procedure and screen display involved in the navigation system for route guidance to a destination. FIG. 1A shows an example of a map screen of the navigation system when the destination is not specified. Typically, the navigation system displays a street on which the vehicle (current vehicle position VP) is running on a map image and a name of the street. Other information such as a north pointer NP, a map scale and a current time may also be illustrated on the display screen.

When a user selects a destination menu, the navigation system displays a "Find Destination by" screen as shown in FIG. 1B for specifying an input method for selecting the destination. When selecting the "Favorites" method in FIG. 1B, the navigation system displays selection methods of favorite places either by "Place Name" or "Place Type" in FIG. 1C. The "Favorites" method is to select a favorite place to visit based on a list of favorite places that have been established in the navigation system by the user. If the "Place Type" is selected, the navigation system lists categories of favorite places as shown in FIG. 1D.

FIG. 1E shows the screen that is displayed when the user has selected a "Restaurant" category in FIG. 1D, which includes a list of restaurants typically sorted by distance from the current position. The user selects a desired destination, as shown in FIG. 1F and presses an "OK to Proceed" button for the navigation system to calculate an appropriate route to the destination. FIG. 1G shows an example of a screen when the navigation system calculates and determines the route to the destination. Then, the navigation system starts the route guidance to the destination as shown in FIG. 1H.

In the application of the navigation system noted above, a user may select a destination from a set of data that the user has established as favorite places such as restaurants, shops, parks, etc. Such favorite locations or places are typically located relatively close to the user's home address since the user tends to visit these locations on a regular basis. Thus, the navigation system typically allows the user to accumulate information on such favorite places in a specific area of database and also accepts the information on the user's home address.

The home address is typically an address of the user's home, but can be his/her office address or other address that is of importance to the user. By pressing the home address for a route guidance operation by the navigation system, the user is able to return to his/her home or office, etc., easily and quickly. In many cases, such favorite places are represented as POIs (points of interest), information of which is available from the map database of the navigation system.

When the user has changed the home address, however, the user has to input new favorite places close to the new home address, which can be cumbersome. For example, if a user in the Los Angeles area is relocated to San Diego, he/she has to change the addresses of the favorite places, such as banks, chain stores, etc., in the Los Angeles area to that of San Diego area, which needs substantial time and efforts. Thus, there is a need that the navigation system incorporates a new function that facilitates the updating procedure of favorite places when the user's home address has changed.

SUMMARY OF THE INVENTION

It is, therefore, an object of the present invention to provide a method and apparatus for updating information on favorite places in a navigation system when a home address of a user has changed.

It is another object of the present invention to provide a method and apparatus for a navigation system which is capable of automatically updating the information on the favorite places related to the old home address to that related to the new home address.

It is a further object of the present invention to provide a method and apparatus for a navigation system which is capable of searching and evaluating favorite places around the new home address which are equivalent to that around the old home address.

It is a further object of the present invention to provide a method and apparatus for a navigation system which is capable of searching favorite places around the new home address which are equivalent to that around the old home address and evaluating them based on overall cost and various criteria.

One aspect of the present invention is a method for updating the information on favorite places pre-established in a navigation system for an old home address to be appropriate to a new home address. The method includes the steps of: checking data received by the navigation system to detect whether the old home address of a user has been changed to the new home address; searching for favorite places around the new home address equivalent to that around the old home address; determining whether the updating of the favorite places should be conducted automatically or upon instruction by the user; updating the favorite places by replacing the favorite places for the old home address stored in the navigation system with the equivalent favorite places for the new home address; and repeating the above steps every time when there is a change in the home address.

In the method noted above, the automatic updating of the favorite places is not conducted when the new home address is closer to the old home address than a predetermined distance. The method further includes a step of receiving an instruction by the user in advance to allow the navigation system to automatically update the favorite places when the home address is changed. After determining that the updating of the favorite places should be conducted upon instruction by the user, the method includes a step of waiting for an instruction by the user for updating the favorite places.

In the method of the present invention, the step of checking data received by the navigation system to detect whether the old home address of the user has been changed to the new home address includes a step of determining an address of the current location detected by the navigation system as the new home address. Further, the step of searching for favorite places around the new home address includes a step of evaluating an overall cost of the favorite place.

In the method of the present invention, the step of searching for favorite places around the new home address includes a step of evaluating attribute data attached to the favorite place associated with the old home address. The attribute data include a brand name or chain of business related to the favorite place, and the step of searching for favorite places around the new home address includes a step of selecting a particular favorite place having the same brand name or chain of the favorite place around the old home address.

In the method of the present invention, the step of searching for favorite places around the new home address includes a step of prioritizing a particular favorite place that is located in an area that the user more frequently visits or passes-by over a similar favorite place that is located in an area that the user less frequently visits or passes-by even though the similar favorite place is located closer to the new home address.

In the method of the present invention, the step of searching for favorite places around the new home address includes a step of prioritizing a particular favorite place that is located in an area that has a plurality of same type of favorite places over a similar favorite place that is located in an area that has no or lesser number of same type of favorite places even though the similar favorite place is located closer to the new home address.

Another aspect of the present invention is an apparatus for a navigation system for updating a pre-established favorite place list when a home address of the user has been changed. The apparatus conducts the automatic updating procedure so that favorite places in the list will be updated to be appropriate to that for the new home address. The apparatus updates the information on the favorite places related to the old home address to that related to the new home address by implementing the various steps defined in the method noted above.

According to the present invention, the method and apparatus enables the navigation system to update a pre-established favorite place list when a home address of the user has been changed. The method and apparatus conducts the automatic updating procedure so that the favorite places in the list will be updated to be appropriate to that for the new home address. The method and apparatus for a navigation system is capable of searching favorite places around the new home address which are equivalent to that around the old home address and evaluating them based on overall costs and various criteria to determine the most appropriate favorite place. Consequently, it is no longer necessary for the user to create or change the information on the favorite places one by one when the user's home address has changed, thereby saving a large amount of time and work that needed in the conventional technology.

BRIEF DESCRIPTION OF THE DRAWINGS

FIGS. 1A-1H are schematic diagrams showing an example of the operational process and the screen display involved in the navigation system for selecting a destination from a pre-established favorite place list and travelling to the destination under the route guidance.

FIG. 2 is a schematic diagram showing an example of the set-up screen of a navigation system that allows a user to set a home address in the navigation system in accordance with the present invention.

FIG. 3 is a schematic diagram showing an example of the screen of the navigation system that accepts a home address input through an alphanumeric keypad in accordance with the present invention.

FIG. 11A shows a frequented area differentiation method and FIG. 11B shows an area density differentiation method for using the supplementary information.

FIG. 12 is a functional block diagram of a vehicle navigation system implementing the method of the present invention for updating the information in response to the change of home address.

DETAILED DESCRIPTION OF THE PREFERRED EMBODIMENT

The method and apparatus for automatically updating the information on favorite places in response to the change of the home address is described in detail with reference to the accompanying drawings. Although the description is made primarily for a vehicle navigation system, the method and apparatus for automatically updating personal and favorite information can be used for many other devices, such as a portable navigation device (portable GPS), PDA (personal digital assistant) device, cellular (mobile) phone, personal computer, etc. having, preferably, a navigation function or a function to provide the favorite locations and the location with a map system.

A home address refers to the address that is saved in the navigation system that serves as the basic location for operation of the navigation system. Typically, the home address is the user's primary place of living such as his/her residence. Although the following description is made primarily for the home address (residential address), the method and apparatus for updating personal and favorite information can also be applied to a workplace address (ex. office address) which is a primary work address, a secondary home address, etc.

In either the home address or workplace address (hereafter "home address"), the user is likely to establish a set of personal and favorite information (locations of favorite places, events, etc.) related to those addresses. This is because it is usually convenient for the user to visit such favorite places that are located relatively closer to his/her home or workplace. Accordingly, a navigation system typically has a selection menu so that the user can select his/her destination from the list of personal and favorite information (hereafter "favorite place") that the user has established.

The favorite places may include, among others; post office, doctor, dentist, veterinarian, grocery store, place of worship, school, gym, department stores, gas station, wholesale store, pharmacy, social network club, association, etc. In most cases, the set of favorite places is created by selecting POIs (point of interest) such as shops, restaurants, banks, etc. A large number of names, addresses, telephone numbers, etc. of POIs are preestablished as a POI database in a map database of the navigation system. Further, the favorite place is not limited to a POI location, but may also include, for example, weather forecast, local news, and local events (concert, festival, sports, etc.).

Figure 4:
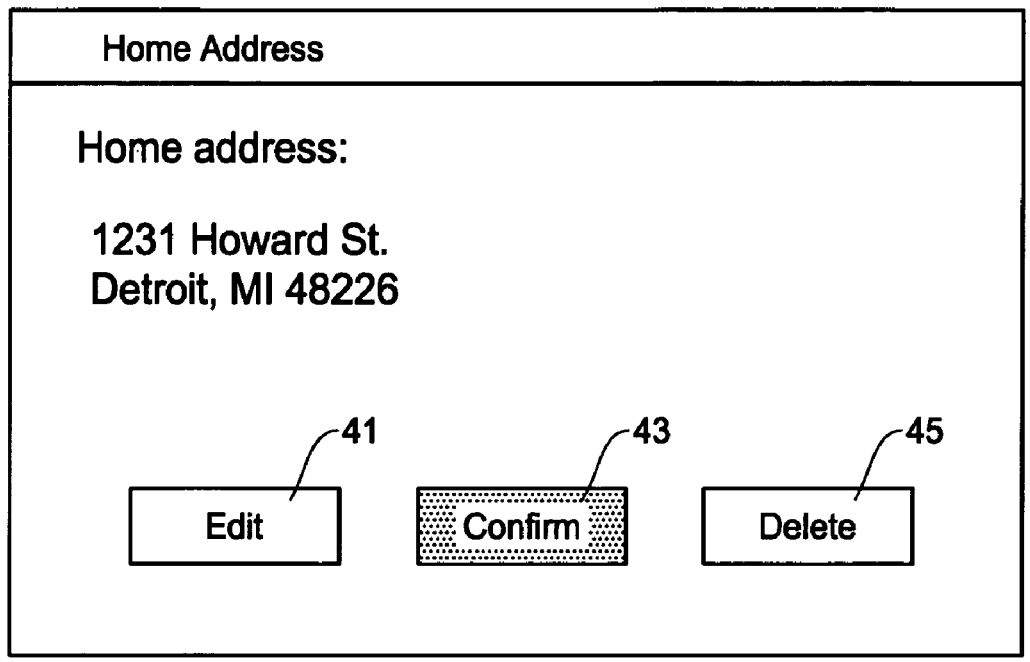
FIG. 4 is a schematic diagram showing an example of the screen of the navigation system that allows the user to either confirm, edit or delete the home address in accordance with the present invention.

With reference to display examples of FIGS. 2, 3 and 4, the basic step of inputting a home address in the navigation system is described. FIG. 2 shows an example of a set-up screen of the navigation system that prompts the user to set various parameters including his/her home address in the navigation system in accordance with the present invention. The set-up screen includes a "Set home address" menu 11 for setting a home address, which is typically a user's primary home of residence.

In this example, in addition to the "Set home address" menu 11, other options, such as a "Route setting" menu 13 to set how a route is to be calculated, a "System" menu 15 for setting a system configuration, a "POI setting" menu 17 to set points of interest (POI), a "Date/Time" menu 19 to set a current time and date, and an "Update" menu 21 for performing an update operation. In FIG. 2, for reflecting the change of the home address, the user selects the "Set home address" menu 11.

In response, the navigation system will show the keyboard screen that allows the user to input the home address as shown in FIG. 3. The screen includes an alphanumeric keypad 31 on the touch screen display which is used to enter street information in a street name field 33 and city information in a city name field 35. Alternatively, in the case where the user is at home and now wants to set the home address, it is possible to press a current location key 37 so that the navigation system detects the current location and automatically sets the address of the current location as the user's home address on the screen.

FIG. 4 is a schematic diagram showing an example of the screen of the navigation system that allows the user to either confirm, edit or delete the home address in accordance with the present invention. As the user enters the necessary information to specify a home address, the navigation system will show a screen of FIG. 4 so that the user can confirm the home address by pressing a "Confirm" key 43, edit the address by pressing an "Edit" key 41, and delete the home address by pressing a "Delete" key 45 on the screen. When the "Confirm" key 43 is pressed and there has been an existing home address, the navigation system will check whether the new home address is different from the exiting home address.

Figure 5:
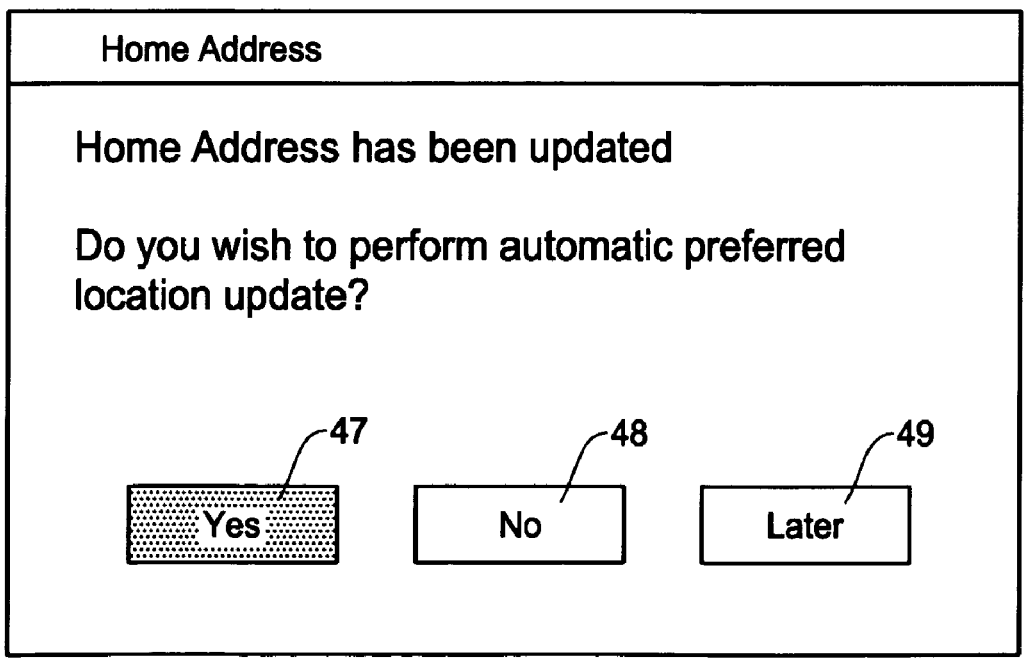
FIG. 5 is a schematic diagram showing an example of the screen of the navigation system that allows the user to instruct the navigation system to perform automatic updating after changing the home address.

FIG. 5 is a schematic diagram showing an example of the screen of the navigation system that allows the user to instruct the navigation system to perform an automatic updating procedure after changing the home address. If the new home address is different from the existing home address, the navigation system will ask the user in this manner so that the user can decide whether to perform the automatic updating of the favorite places stored in the navigation system. In the example of FIG. 5, the screen shows keys 47-49 for the user to select either to perform the automatic update or to make such determination later. As will be described later, the navigation system may not perform the automatic updating procedure if the new home address is relatively close to the old home address such as within the same city, town or within a predetermined distance range, etc.

Although the above description shows the steps of manually entering the information on the home address, the navigation system may set the home address by allowing the user to set the current location as the home address. As noted above with reference to FIG. 3, such a function will be conducted by pressing the current location key 37. In such a case, the navigation system having the geographic coordinate information of the current location refers to the map data of the navigation system to find the current location and extract the corresponding address to set the current location as the home address.

Figure 6:
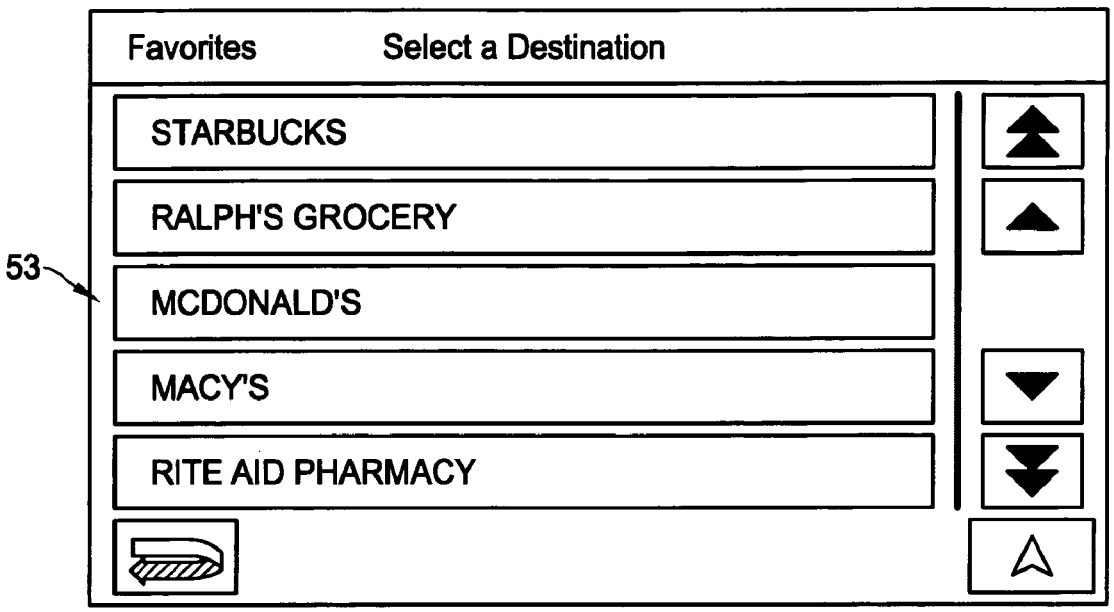
FIG. 6 is a schematic diagram showing an example of the screen of the navigation system that lists the favorite places that have been established so far by the user for selecting the favorite places to be updated for reflecting the change of the home address.

FIG. 6 is a schematic diagram showing an example of the screen of the navigation system that lists the favorite places that have been established by the user. This screen is used for selecting the favorite places one by one to update the locations for reflecting the change of the home address. The example of FIG. 6 shows a favorite place list 53 which lists the user's favorite places in the order of distance from the home address, or in the order of alphabet, category groups, etc.

Assuming that the previous home address of the user that was set in the navigation system is in Torrance, Calif., and a specific address of the favorite place "Starbucks" in the favorite place list 53 is "21209 Howthorne Blvd #A, Torrance, Calif.". When the user changes the home address to Phoenix, Ariz., the automatic update function of the present invention will change the specific address of "Starbucks" to an address of, for example, "2340 E Baseline Rd #166, Phoenix, Ariz.". Namely, the navigation system automatically changes the address of the favorite place "Starbucks" in the list to that close to the new home address.

Figure 7:
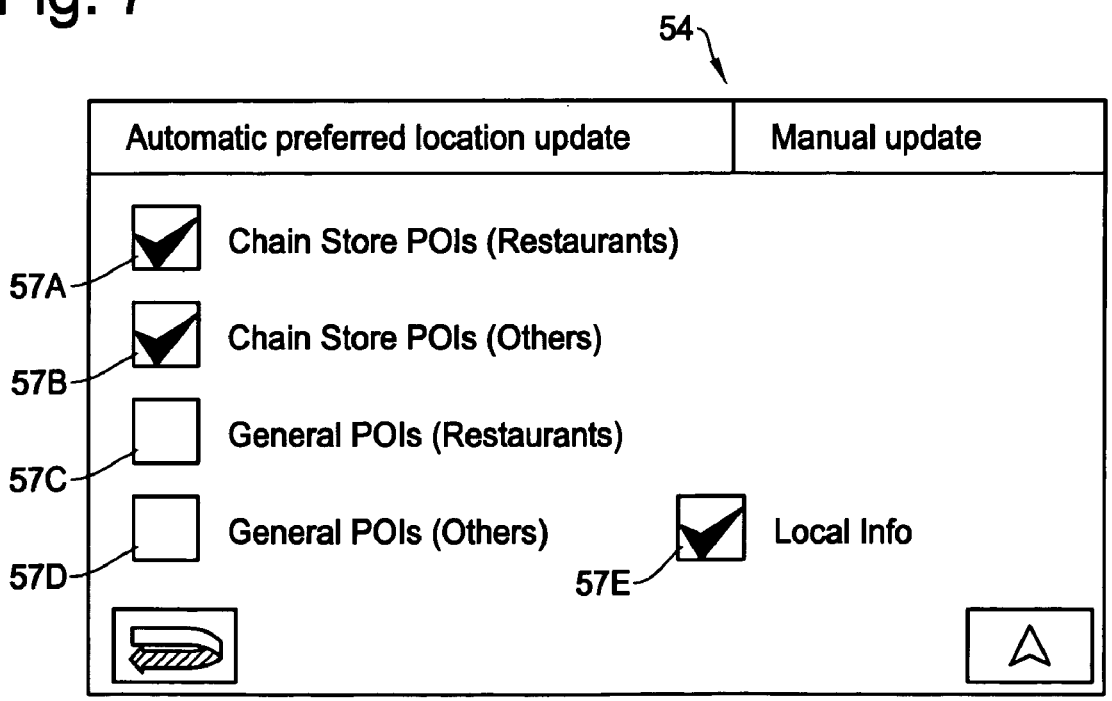
FIG. 7 is a schematic diagram showing an example of the screen of the navigation system that lists the type of favorite places for selecting the type of favorite places to be updated for reflecting the change of the home address.

FIG. 7 is a schematic diagram showing an example of the screen of the navigation system that lists the selection keys to select a type of favorite place. Thus, the navigation system prompts the user to select the type of information to update the favorite place when reflecting the change of the home address. In this example, chain store POI keys 57A and 57B, general POI keys 57C and 57C, and a local information key 57E are illustrated on the screen. An upper area 54 of the screen allows the user to select either an automatic mode or a manual mode for updating the selected type of POIs or the local information.

The chain store POI key 57A is directed to the restaurant chain, and the chain store POI key 57B is directed to other types of chain, the general POI key 57C is directed to the restaurant category, and the general POI key 57D is directed to the other categories, and the local information key 57E is directed to information related to the home address such as news, weather, events, etc. At the head of each selection key, a check box is provided so that the user is able to put a check mark that indicates which category of the favorite places the information should be updated.

In this example, as noted above, such category keys are differentiated into restaurants and others although there may be various other ways of classifying them. As noted above, the local information key 57E is to select the local information which includes local events, local news, local weather, local sports, etc. The categories of favorite places and selection method thereof will be explained in more detail later.

Figure 8:
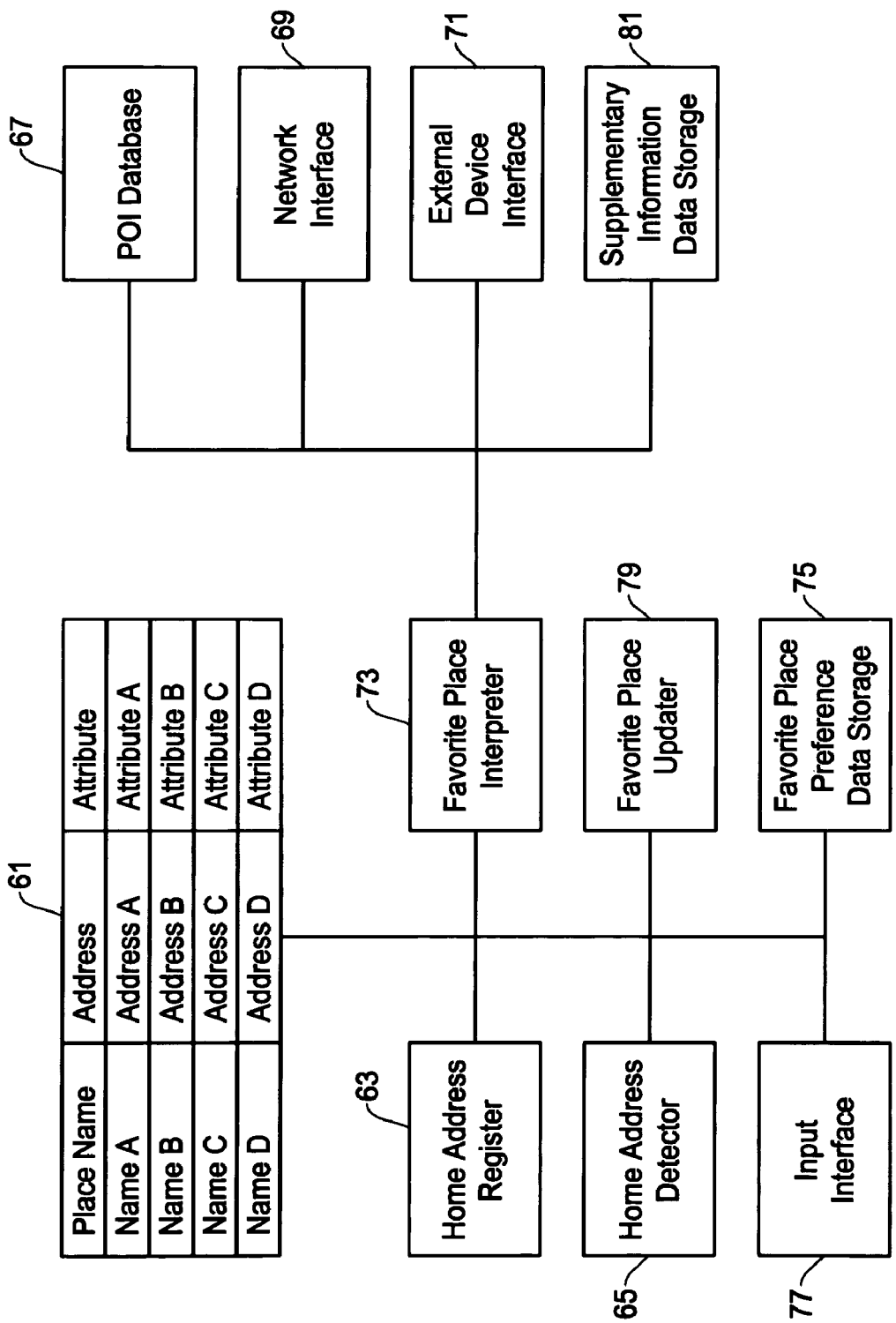
FIG. 8 is a schematic diagram showing an example of the functional blocks for implementing the automatic updating procedure for the information on the favorite places based on the home address in the present invention.

FIG. 8 is a schematic diagram showing an example of functional blocks of the present invention for implementing the automatic update of the information on the favorite places in response to the change of the home address. In the example of FIG. 8, the functional diagram includes an information table 61, a home address register 63, a home address detector 65, an input interface 77, a favorite place interpreter 73, and a favorite place updater 79. The functional diagram of FIG. 8 further includes a favorite place preference data storage 75, a POI database 67, a network interface 69, an external device interface 71, and a supplementary information data storage 81.

The information on the favorite places, as described above, includes various locations that the user has been associated with as well as local events, weather forecast, local news, etc. Such favorite place information is listed in the information table 61 in FIG. 8. In the information table 61, each entry has a place name, an address and phone number, attribute data, etc.

The information in the attribute data may include category (type), brand or chain, specific feature, etc. For example, one attribute of a favorite place "24 Hour Fitness" may be its brand (ex. indicating a fitness center chain) while other attribute of "24 Hour Fitness" may be a club's type, such as the one with a swimming pool or not, etc. Another example of attribute data is, for example, live performance of music or other show at a particular restaurant or shop, etc.

The home address register 63 stores the home address (residential address, workplace address, or other specified address) of the user. The home address detector 65 detects the home (work) address stored in the home address register 63. The home address detector 65 is able to detect if the home address has been changed. When the change of the home address has been detected by the home address detector 65, the favorite place updater 79, which may be a microprocessor, controls an overall procedure of the present invention and starts the steps of updating the favorite places.

For example, the favorite place updater 79 reads the new home address from the home address register 63. Then the favorite place updater 79 will read the favorite place information from the information table 61. The favorite place preference data storage 75 stores the data to determine how to update the information on the favorite places which is used by the favorite place updater 79 during the updating procedure.

For example, in the case of the gym described above, the favorite place preference data storage 75 may have the data that inform the favorite place updater 79 to choose a gym with the same brand as the original gym rather than proximity (distance) from the new home address. Thus, the gym with the same brand, for example, "24 Hour Fitness" that is closest to the new home address is selected as the candidate for updating the information. Namely, "24 Hour Fitness" is prioritized over a gym that is not the same brand but is closer to the home address.

The input interface 77 functions as an interface that accepts user input through such devices as keypads, touch screen or voice recognition unit, etc. The POI database 67 can be a part of the map database and stores POI entries that cover the whole country. The POI database 67 is used to search candidate entry for updating the favorite place information for the new home address.

The network interface 69 is an interface for communication to and from an outside network such as Internet via wireless communication or a dedicated server connected to a third party. The wireless communication may include a cellular network such as SMS. The favorite place updater 79 may access Internet to collect information on candidate favorite places including relevant attribute information. The favorite place updater 79 evaluates the information retrieved vie such outside network as well as that retrieved from the information table 61 and from the supplementary information data storage 81.

For example, for searching a medical doctor, the qualification and reputation of the doctor may be searched for the updating procedure. For searching a restaurant, the review points such as five star ratings, etc, may be taken into account. This ratings information allows the navigation system to select a particular type of restaurant with the user review of three stars or higher located near the new home address.

The external device interface 71 is used to read information from external devices, such as a portable memory (USB flash drive, compact flash, etc) or a CD/DVD reader. If information on candidate favorite places is available via such external devices, the favorite place updater 79 will read such data via the external device interface 71. The favorite place interpreter 73 interprets the accumulated information, for example, to determine which items are to be used to update the favorite place information.

The supplementary information data 81 stores supplementary information (auxiliary criteria) needed to make an improved suggestion for incorporating equivalent favorite places. An example of such supplementary information is a frequented area information described with reference to FIG. 11A. Another example of supplementary information is a density of location information described with reference to FIG. 11B.

Figure 9:
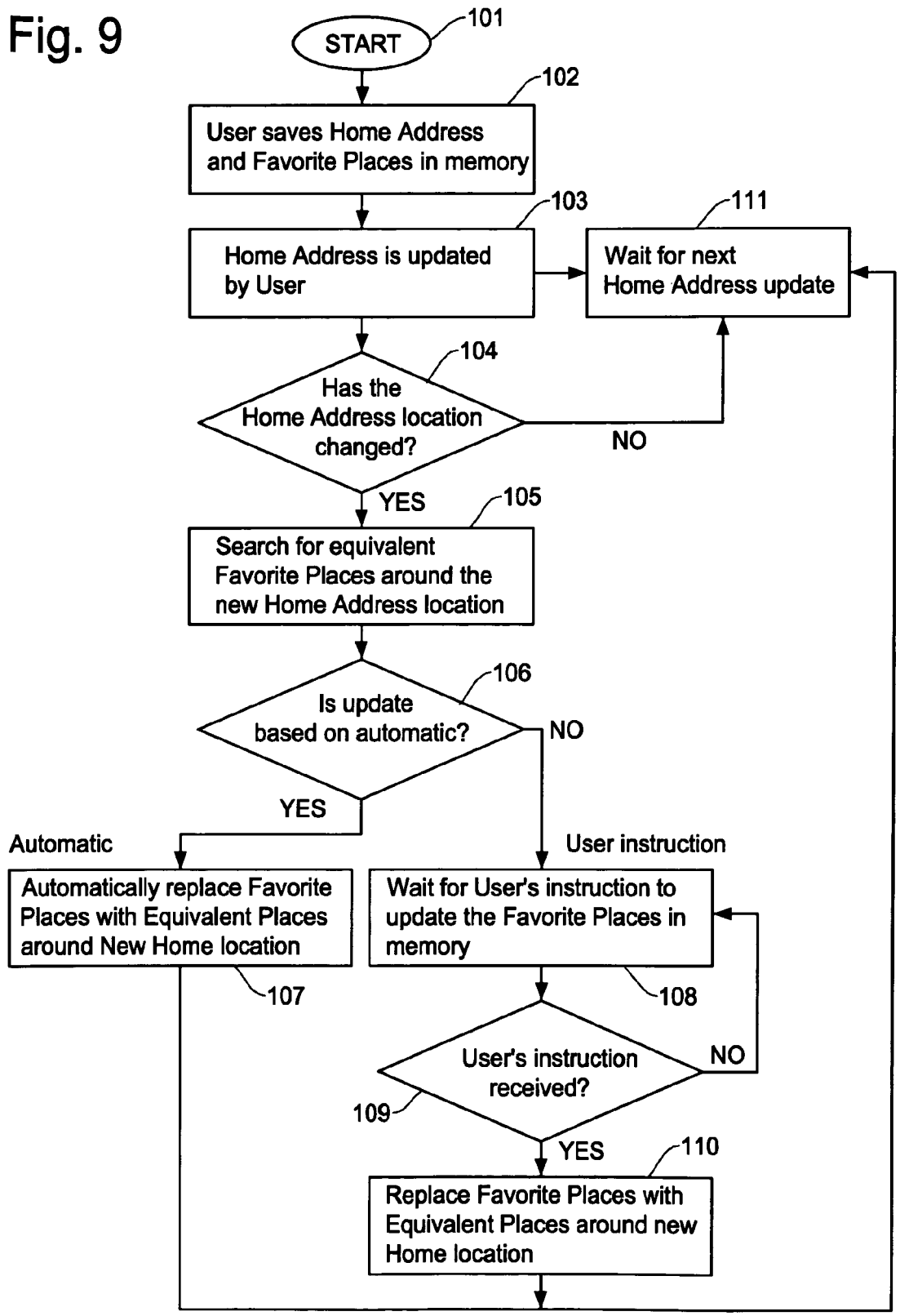
FIG. 9 is a flow chart showing an example of the overall operation of the automatic updating procedure regarding the favorite places that reflects the change of the home address in the present invention.

FIG. 9 is a flow chart showing an example of the overall operation of the automatic updating of favorite places reflecting the change of the home address in accordance with the present invention. The overall process of FIG. 9 may be controlled by the favorite place updater 79 in FIG. 8 which is typically a microprocessor. As the operation starts at the step 101, the user saves his/her home address and favorite places in the memory (home address register 63 in FIG. 8) of the navigation system in the step 102. For example, the home address is entered in the manner described with reference to FIGS. 2 to 4 as noted above.

In the step 103, the user has changed the home address, i.e., the navigation system accepts the new home address specified by the user through the process shown in FIGS. 2-4 noted above. In the step 104, the navigation system checks whether the home address has been changed by the user and, if so, compares the old home address and the new home address. This procedure may be performed by checking a flag that is triggered every time a new home address is input by the user by the home address detector 65 of FIG. 8.

If it is determined that the home address has been changed in the step 104, the navigation system will search for equivalent favorite places around the new home address location in the step 105 from, for example, the POI database 67 in FIG. 8. In the step 104, in comparing the old home address and the new home address, the navigation system may not perform the automatic updating procedure if the new home address is relatively close to the old home address even if the new home address has been entered. This is to avoid the automatic updating of favorite places for a small change of home address such as within a predetermined short distance range on the assumption that users do not want to change the favorite places in such a case.

In comparing the old and new home addresses, the navigation system may take a linear distance between the two locations, which is compared to a predetermined minimum distance. For example, the minimum distance of two miles may be set, and if the new home address is located within a two mile radius of the old home address, the automatic update procedure will not be performed. The minimum distance of two miles described above is merely an example, and it may take a range between, for example, one mile to 20 miles. The minimum distance may vary depending on a type of area (city or rural area, etc), a type of transportation (vehicle, bicycle, etc.) on which the navigation system is mounted, etc.

The details of searching the equivalent favorite places in step 105 will be further elaborated later with reference to the flow chart of FIG. 10. After obtaining the equivalent favorite places, in the step 106, the navigation system checks whether the update should be performed automatically without involving the user's instruction. The determination of this step may be pre-configured by the user such that the user sets the navigation system to allow the automatic updating without the user's instruction.

Moreover, the determination regarding the automatic update or not may depend on how certain the likelihood of having found favorite place information suited to the user. For example, a post office that is found at a relatively large distance from the new home address may have high certainty that it is a suited equivalent favorite place. On the other hand, searching a suitable equivalent of a dentist would require finer criteria for determination, such as the qualification of the doctor or insurance acceptability, etc, and is therefore less certain that the equivalent favorite place (dentist) is suited to the user.

In the step 106, if the navigation system determines that automatic update is to be performed, the process moves to the step 107. The navigation system will automatically replace the favorite places in the memory (information table 61 in FIG. 8) to the equivalent places that have been found in the previous steps. At this stage, the old favorite places may be backed up in a specified storage of the navigation system in case the user wants to make use of them later.

In the step 106, if the navigation system determines that automatic update is to be performed, the process moves to the step 107. The navigation system will automatically replace the favorite places in the memory (information table 61 in FIG. 8) with the equivalent places that have been found in the previous steps. At this stage, the old favorite places may be backed up in a specified storage of the navigation system in case the user wants to make use of them later.

If the user's instruction is received, the process moves to the step 110 where the navigation system replaces the equivalent favorite places with the new favorite places. After completing the update in the step 110, the process goes to the step 111 where the navigation system will wait for the next home address change. Thus, the operation of the updating procedure ends.

Figure 10:
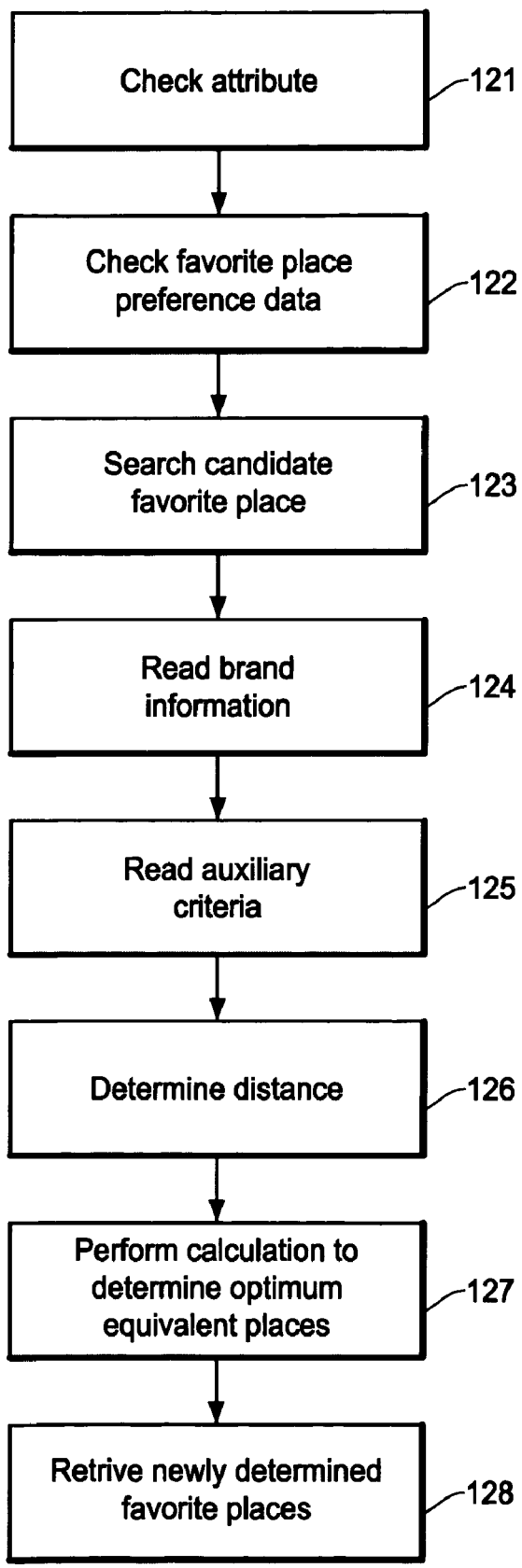
FIG. 10 is a flow chart showing the detailed steps of searching the equivalent favorite places in the present invention which corresponds to the step 105 in the flow chart of FIG. 9.

Referring to the flow chart of FIG. 10, the procedure for finding favorite places around the new home address equivalent to the favorite places around the old home address is described in more detail. Namely, the steps described in the flow chart in FIG. 10 are sub-steps of the step 105 in the overall flow chart of FIG. 9. As noted above, in the step 105, the equivalent favorite places are searched and assessed for the updating procedure upon change of the home address.

In the step 121, the navigation system checks the attribute information regarding the existing favorite places from the information table 61 shown in FIG. 8. The attribute information on the favorite places includes, among others, such information as a category (restaurant, ATM, supermarket, etc.), a brand name (McDonald, Carl's Junior, etc) or chain of business, religious affiliation (Presbyterian, Methodist, Orthodox, etc.), whether a user has a membership or discount ticket, etc. The attribute information can be used to retrieve information on new places that are believed to be equivalent and relevant to the existing (old) favorite places.

After checking the attribute, in the step 122, the navigation system will check the favorite place preference data in the favorite place preference data storage 75 shown in FIG. 8. The favorite place preference data is the data that defines which criteria are given more weight for finding an equivalent favorite place. For example, the favorite place preference data may indicate that, for finding an equivalent fast food restaurant, the navigation system is to find a particular brand name (ex. McDonald), i.e., chain restaurants, over other restaurant brands and then find the restaurant that is closest to the new address, i.e., the brand name is higher preference than the distance in this example.

Likewise, the favorite place preference data for a gas station may give preference to a particular gas station brand (ex. Arco), i.e., chain gas stations, over others. The favorite place preference data may also be a broad category such as a fast-food restaurant including hamburger, pizza, and Mexican fast food, etc. In such a case, any type of fast food restaurant will be given equal weight as a candidate equivalent location over non-fast food restaurants.

In the step 123, the navigation system will search equivalent favorite places typically from the POI database 67 in FIG. 8 to find candidate places to replace the old favorite places. If applicable, the navigation system reads brand information of candidate favorite places from the information table 61 in FIG. 8 in the step 124, and reads auxiliary criteria from the supplementary information data storage 81 with respect to the candidate favorite places in the step 125. The navigation system then checks the distances between the candidate favorite places and the new home address in the step 126.

The distance may be measured based on the map data as a direct (linear) distance or an estimated driving distance from the new home address. The navigation system performs a calculation of overall cost to determine the best equivalent favorite place based on the information derived from the preference data, brand, auxiliary criteria, and distance in the step 127. Finally, in the step 128, the navigation system determines the optimum favorite places associated with the new home address.

Figure 11A:
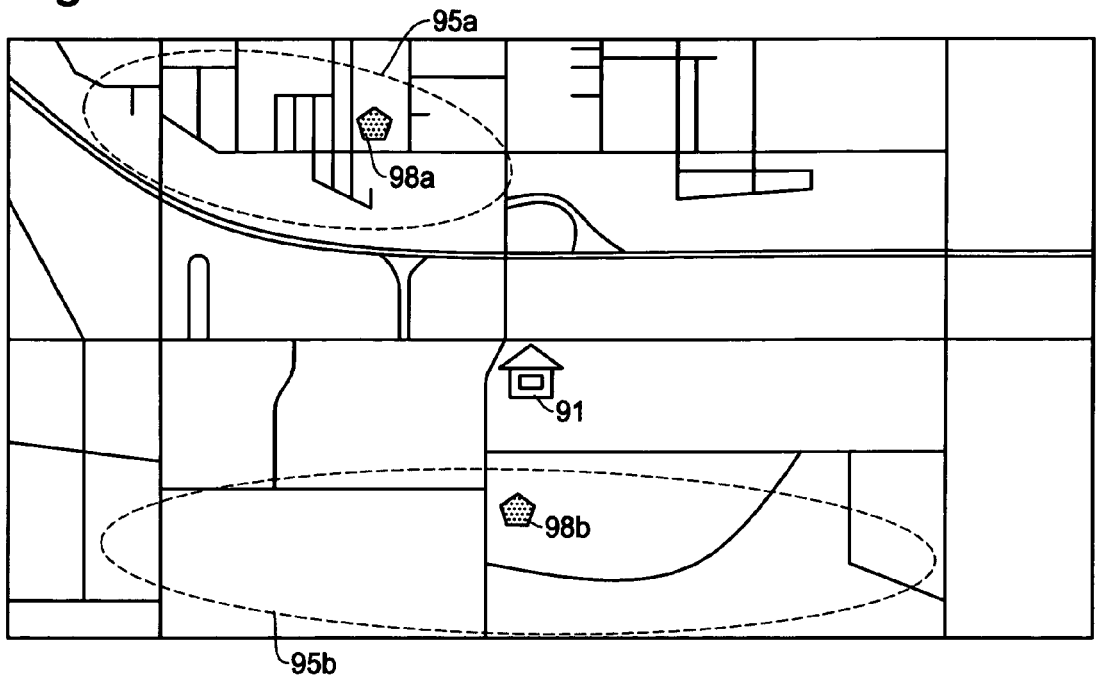
FIGS. 11A and 11B are schematic diagrams showing an example of application of the present invention by incorporating supplementary information where
Figure 11B:
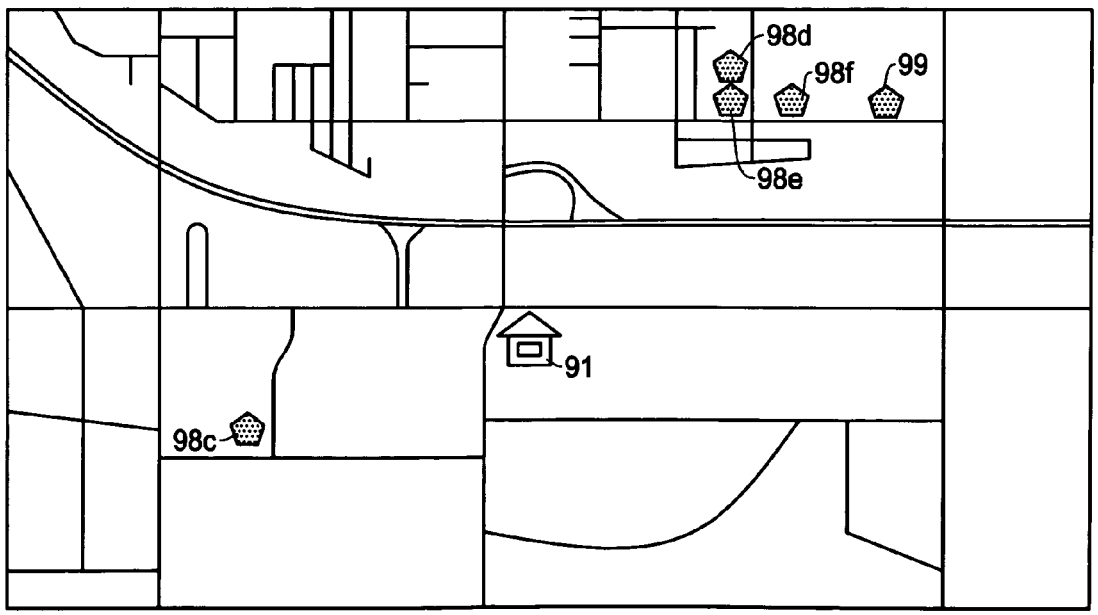

FIGS. 11A and 11B are schematic diagrams showing an example of the application of the present invention by incorporating the supplementary information (auxiliary criteria) where FIG. 11A shows a frequented area differentiation method and FIG. 11B shows an area density differentiation method for using the supplementary information. In determining relevant information for finding an equivalent favorite place, the navigation system needs to interpret which information is more relevant. For example, in determining an equivalent church for a new home address, religious affiliation (denomination) may be more important than the proximity from the new address.

The database such as the supplementary information data storage 81 provided in the navigation system may include the supplementary information that shows such religious affiliation information and other relevancy information. In addition, the navigation system may have the means, such as the network interface 69 and external device interface 71 in FIG. 8, to update geographic information so that it can acquire such supplementary information via communication with the outside network such as the Internet or dedicated server. For example, the navigation system may have wireless network communication capability which allows the user or navigation system to retrieve supplementary information from remote servers.

Further, the navigation system can search the Internet website or dedicated server for a restaurant guide, restaurant reviews such as Yelp, zagat or Cityguide, that have ratings by reviewers. The restaurant rating can be used to find an equivalent restaurant for the new home address. For example, an Italian restaurant that has higher than three star rating located closest to the home address may be selected as the equivalent restaurant. The price range information on restaurants may also be used, for example, by setting the price range up to a specific amount per person. The navigation system also checks a yellow page for new businesses.

In analyzing such information from the internet, the navigation system may have a parser that reads and analyzes the information. The parser can perform syntactic analysis and lexical analysis to determine relevant attributes of a candidate favorite place. In the alternative, a dedicated website may be provided that has complied information from restaurant guides, yellow page, etc. so that the navigation system is able to read and interpret the information for the present invention.

For determining an equivalent favorite place, the navigation system generally uses a distance from the new home address, i.e, proximity to the home address. The proximity can be further refined by analyzing how frequently the user has driven the vehicle in a particular area. For example, as shown in the map view of FIG. 11A, the home address 91 is located at around the center of the map, and candidate favorite places 98a and 98b are located at upper and lower areas of the map.

The candidate favorite place 98a is located from the home address with a distance farther than the candidate favorite place 98b. Further, the candidate favorite place 98a is located in an area 95a that the user visits or passes-by more frequently than an area 95b where the candidate favorite place 98b is located. In this case, even though the candidate favorite place 98b is located closer to the home address 91, the candidate favorite place 98a will be selected as a final favorite place. The navigation system can accumulate the data necessary to make a determination as to which area the user frequents and evaluate the overall cost involved in visiting the candidate favorite places.

Moreover, in determining which equivalent place should be given priority over other places, an area where a plurality of new equivalent places are located may be given priority over a sparse area. The map view in FIG. 11B illustrates the case where the home address 91 is located at about the center of the map and a plurality of candidate favorite places are found around the home address 91. In this example, a candidate favorite place 98c is the closest to the home address 91, however, there are a plurality of candidate favorite places 98d, 98e, and 98f within a relatively small area.

In this case, the candidate favorite places 98d, 98e, and 98f will be given the priority over the candidate favorite place 93c. In this manner, density of equivalent places is taken into consideration for determining the equivalent favorite place because it is usually convenient for a user to visit the favorite place where there are other equivalent favorite places nearby. Among the candidate favorite places 98d-98f, the favorite place 98e may be the most likely candidate since it is the closest equivalent place to the home address 91 if all the other conditions are the same.

The calculation for making this determination may be implemented in various ways. For example, the cost of a specific place can be decreased by a predetermined coefficient based on the number of equivalent places nearby. For example, in the case of FIG. 11B, one nearby equivalent location is given coefficient of 0.9 and since there are three (98d, 98e, 98f), the coefficient of 0.73 (0.9×0.9×0.9) is applied to each of the candidate favorite places 98d-98f which will be multiplied with the cost to obtain the overall cost.

When the overall cost is lower than that of the candidate favorite place 98c, the candidate favorite places 98d-98f will have the priority over the candidate favorite place 98c. As noted above, among the candidate favorite places 98d-98f, the favorite place 98e may be finally selected since it is closest to the home address 91 if all the other conditions are the same. In this manner, density of locations is taken into consideration for determining the equivalent location.

In a further implementation, it is also possible to select a favorite place even though its overall cost is not the lowest among the plurality of places if the favorite place is closer to another favorite place of different kind. For example, in FIG. 11B, it is assumed that a POI 99 is another favorite place of the user which is the different category from that of the favorite places 98d-98e. In such a situation, it is also possible to select the favorite place 98f as the best place since it is the closest to another favorite place 99 of the user.

FIG. 12 shows an embodiment of the structure of a vehicle navigation system for implementing the method and apparatus of automatic update of favorite places in the present invention. While the vehicle navigation system is explained for an illustration purpose, the present invention can also be applied to other types of electronic device that have a map system and can save the home location and the favorite locations, such as a portable navigation device implemented by a PDA (personal digital assistant) device, other hand-held devices such as a wireless telephone, or a laptop or notebook computer.

In the block diagram, the navigation system includes a data storage device 231 such as a hard disc, CD-ROM, DVD, flash memory or other storage means for storing the map data. The navigation system includes a control unit 232 for controlling an operation for reading the information from the data storage device 231, and a position measuring device 233 for measuring the present vehicle position or user position. For example, the position measuring device 233 has a vehicle speed sensor for detecting a moving distance, a gyroscope for detecting a moving direction, a microprocessor for calculating a position, a GPS (global positioning system) receiver for receiving and analyzing GPS signals, and etc.

The block diagram of FIG. 12 further includes a map information memory 234 for storing the map information which is read from data storage device 231, a database memory 235 for storing database information such as point of interest (POI) information which is read out from the data storage device 231, an input device 237 such as a remote controller for executing a menu selection operation, an enlarge/reduce operation, a destination input operation, etc. and an input device interface 238. Although a remote controller is a typical example for selecting menus, executing selected functions and etc., the navigation system includes various other input methods to achieve the same and similar operations done through the remote controller.

In FIG. 12, the navigation system further includes a bus 236 for interfacing the above units in the system, a processor (CPU) 239 for controlling an overall operation of the navigation system, a ROM 240 for storing various control programs such as a route search program and a map matching program necessary for navigation control, a RAM 241 for storing a processing result such as a guide route, a display controller 243 for generating map image (a map guide image and an arrow guide image) on the basis of the map information, a VRAM 244 for storing images generated by the display controller 243, a menu/list generating unit 245 for generating menu image/various list images, a synthesizing unit 246, a wireless communication device 249 for wireless communication with a remote server or a network, a buffer memory 248 for temporally storing data for ease of data processing, a monitor (display) 250 as a man-machine interface, and a data interface 251.

The monitor (display) 250 may be a touch screen or a multi-touch display that serves as an input device as well as a display device. The data interface 251 is an interface to an external (outside) device, such as a flash memory device. A computer program that performs the operation described in the steps shown in FIGS. 9 and 10 is stored in the ROM 240 and executed by the CPU 239. The CPU 239 controls the overall process of updating the favorite place information when the home address has changed as described in the foregoing.

When the change of the home address is detected, the data storage device 231 is searched to find equivalent favorite places around the new home address. Through the wireless communication device 249 and the data interface 251, the navigation system can further accumulate the data to determine the equivalent favorite places. After obtaining the new favorite places for the new home address, the new favorite places will be stored in the data storage device 231, buffer memory 248, or other memory of the navigation system.

As has been described above, according to the present invention, the method and apparatus enables the navigation system to update a pre-established favorite place list when a home address of the user has been changed. The method and apparatus conducts the automatic updating procedure so that the favorite places in the list will be updated to be appropriate to that for the new home address. The method and apparatus for a navigation system is capable of searching favorite places around the new home address which are equivalent to that around the old home address and evaluating them based on overall costs and various criteria to determine the most appropriate favorite place. Consequently, it is no longer necessary for the user to create or change the information on the favorite places one by one when the user's home address has changed, thereby saving a large amount of time and work that needed in the conventional technology.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method for updating information on existing favorite places pre-established in a navigation system for an old home address to be appropriate to a new home address, comprising the following steps of:
   checking, using a processor of the navigation system, data received by the navigation system to detect whether the old home address of a user has been changed to the new home address;
   evaluating attribute data regarding the existing favorite places related to the old home address;
   searching for new favorite places around the new home address equivalent to the existing favorite places around the old home address based on the attribute data regarding the existing favorite places;
   determining whether the updating of the existing favorite places should be conducted automatically or upon instruction by the user;
   updating the existing favorite places pre-established by the user and stored in the navigation system by replacing the existing favorite places for the old home address stored in the navigation system with the equivalent new favorite places for the new home address; and
   repeating the above steps every time when there is a change in the home address;
   wherein the home address is an address selectively input by the user and is saved in the navigation system that serves as a basic location of the user for operation of the navigation system.

2. A method for updating information on existing favorite places as defined in claim 1, wherein said automatic updating of the existing favorite places is not conducted when the new home address is closer to the old home address than a predetermined distance.

3. A method for updating information on existing favorite places as defined in claim 1, further comprising a step of receiving an instruction by the user in advance to allow the navigation system to automatically update the existing favorite places when the home address is changed.

4. A method for updating information on existing favorite places as defined in claim 1, after determining that the updating of the existing favorite places should be conducted upon instruction by the user, further comprising a step of waiting for an instruction by the user before updating the existing favorite places.

5. A method for updating information on existing favorite places as defined in claim 1, said step of checking data received by the navigation system to detect whether the old home address of the user has been changed to the new home address includes a step of determining an address of a current location detected by the navigation system as the new home address.

6. A method for updating information on existing favorite places as defined in claim 1, said step of searching for new favorite places around the new home address includes a step of evaluating an overall cost of the new favorite place which includes a distance to the new favorite place.

7. A method for updating information on existing favorite places as defined in claim 1, wherein said attribute data include a brand name or chain of business related to the existing favorite place, and said step of searching for new favorite places around the new home address includes a step of selecting a particular new favorite place having the same brand name or chain of the existing favorite place around the old home address.

8. A method for updating information on existing favorite places as defined in claim 1, said step of searching for new favorite places around the new home address includes a step of prioritizing a particular new favorite place that is located in an area that the user more frequently visits or passes-by over a similar new favorite place that is located in an area that the user less frequently visits or passes-by even though the similar new favorite place is located closer to the new home address.

9. A method for updating information on existing favorite places as defined in claim 1, said step of searching for new favorite places around the new home address includes a step of prioritizing a particular new favorite place that is located in an area that has a plurality of same type of favorite places over a similar new favorite place that is located in an area that has no or lesser number of same type of favorite places even though the similar new favorite place is located closer to the new home address.

10. An apparatus for updating information on existing favorite places pre-established in a navigation system for an old home address to be appropriate to a new home address, comprising:

means for checking data received by the navigation system to detect whether the old home address of a user has been changed to the new home address;

means for evaluating attribute data regarding the existing favorite places related to the old home address;

means for searching for new favorite places around the new home address equivalent to the existing favorite places around the old home address based on the attribute data regarding the existing favorite places;

means for determining whether the updating of the existing favorite places should be conducted automatically or upon instruction by the user;

means for updating the existing favorite places preestablished by the user and stored in the navigation system by replacing the existing favorite places for the old home address stored in the navigation system with the equivalent new favorite places for the new home address; and means for repeating the above steps every time when there is a change in the home address;

wherein the home address is an address selectively input by the user and is saved in the navigation system that serves as the basic location of the user for operation of the navigation system.

11. An apparatus for updating information on existing favorite places as defined in claim 10, wherein said automatic updating of the existing favorite places is not conducted when the new home address is closer to the old home address than a predetermined distance.

12. An apparatus for updating information on existing favorite places as defined in claim 10, further comprising means for receiving an instruction by the user in advance to allow the navigation system to automatically update the existing favorite places when the home address is changed.

13. An apparatus for updating information on existing favorite places as defined in claim 10, further comprising means for waiting for an instruction by the user before updating the favorite places, after determining that the updating of the existing favorite places should be conducted upon instruction by the user.

14. An apparatus for updating information on existing favorite places as defined in claim 10, said means for checking data received by the navigation system to detect whether the old home address of the user has been changed to the new home address includes means for determining an address of a current location detected by the navigation system as the new home address.

15. An apparatus for updating information on existing favorite places as defined in claim 10, said means for searching for new favorite places around the new home address includes means for evaluating an overall cost of the new favorite place which includes a distance to the favorite place.

16. An apparatus for updating information on existing favorite places as defined in claim 10, wherein said attribute data include a brand name or chain of business related to the existing favorite place, and said means for searching for new favorite places around the new home address includes means for selecting a particular new favorite place having the same brand name or chain of the existing favorite place around the old home address.

17. An apparatus for updating information on existing favorite places as defined in claim 10, said means for searching for new favorite places around the new home address includes means for prioritizing a particular new favorite place that is located in an area that the user more frequently visits or passes-by over a similar new favorite place that is located in an area that the user less frequently visits or passes-by even though the similar new favorite place is located closer to the new home address.

18. An apparatus for updating information on existing favorite places as defined in claim 10, said means for searching for new favorite places around the new home address includes means for prioritizing a particular new favorite place that is located in an area that has a plurality of same type of favorite places over a similar new favorite place that is located in an area that has no or lesser number of same type of new favorite places even though the similar new favorite place is located closer to the new home address.

* * * * *